United States Patent
Kullen et al.

(10) Patent No.: US 10,315,486 B2
(45) Date of Patent: Jun. 11, 2019

(54) AIR-CONDITIONING UNIT OF A MOTOR VEHICLE AND MOTOR VEHICLE

(71) Applicant: Mahle International GmbH, Stuttgart (DE)

(72) Inventors: Philipp Kullen, Stuttgart (DE); Thorsten Moellert, Stuttgart (DE); Michael Sickelmann, Kornwestheim (DE); Vincenzo Venezia, Weil im Schoenbuch (DE)

(73) Assignee: Mahle International GmbH (DE)

( * ) Notice: Subject to any disclaimer, the term of this patent is extended or adjusted under 35 U.S.C. 154(b) by 115 days.

(21) Appl. No.: 15/435,262

(22) Filed: Feb. 16, 2017

(65) Prior Publication Data

US 2017/0232813 A1 Aug. 17, 2017

(30) Foreign Application Priority Data

Feb. 17, 2016 (DE) .................. 10 2016 202 444

(51) Int. Cl.
*B60H 1/00* (2006.01)
*B60H 1/32* (2006.01)

(52) U.S. Cl.
CPC ......... *B60H 1/0005* (2013.01); *B60H 1/3229* (2013.01); *B60H 1/3233* (2013.01); *B60H 2001/00164* (2013.01)

(58) Field of Classification Search
CPC ............... B60H 1/0005; B60H 1/3229; B60H 2001/00164; B60H 1/3233; B60H 1/00028; B60H 1/00; B60H 1/00057; B60H 2001/00128; B60H 1/00335; G05D 23/138
See application file for complete search history.

(56) References Cited

U.S. PATENT DOCUMENTS

| 6,311,763 B1* | 11/2001 | Uemura ............. B60H 1/00664 165/43 |
| 2013/0098595 A1* | 4/2013 | Schall .................. B60H 1/0005 165/202 |

(Continued)

FOREIGN PATENT DOCUMENTS

| CN | 201205858 Y | 3/2009 |
| DE | 19731369 C1 | 7/1998 |
| DE | 19731369 C1 | 7/1998 |

(Continued)

OTHER PUBLICATIONS

German Search Report dated Mar. 1, 2017 for German Application No. 10 2016 202 444.2.

(Continued)

*Primary Examiner* — Ana M Vazquez
(74) *Attorney, Agent, or Firm* — Fishman Stewart PLLC

(57) ABSTRACT

An air-conditioning unit of a motor vehicle may include a fan, an evaporator, and a heat exchanger. The heat exchanger may be arranged downstream of the evaporator. The evaporator and heat exchanger may both be arranged in a housing. The air-conditioning unit may also include a first bypass channel bypassing the evaporator. The first bypass channel may be arranged centrally on a side of the evaporator. A width of the first bypass channel may be smaller than a width of the side of the evaporator on which the first bypass channel is arranged.

20 Claims, 2 Drawing Sheets

(56) References Cited

U.S. PATENT DOCUMENTS

2014/0048227 A1\* 2/2014 Saitou .................. B60H 1/0005
                                                    165/48.1
2015/0158365 A1\* 6/2015 Hashimoto .......... B60H 1/0005
                                                    165/11.1

FOREIGN PATENT DOCUMENTS

| DE | 102004056814 A1 | 8/2005 |
| DE | 102008059085 A1 | 7/2009 |
| DE | 102010029495 A1 | 12/2011 |
| DE | 102010029495 A1 | 12/2011 |
| JP | A07276971 A | 7/1994 |
| JP | 2006027377 A | 2/2006 |
| JP | 20106325 | 6/2008 |
| JP | 2011111094 | 11/2009 |

OTHER PUBLICATIONS

English Abstract of DE19731369.
English Abstract of DE102004056814.
English Abstract of DE102008059085.
English Abstract of DE102010029495.
English abstract for DE-19731369.
English abstract for CN-201205858.
English abstract for JP-2006027377.

\* cited by examiner

A-A

B-B

AIR-CONDITIONING UNIT OF A MOTOR VEHICLE AND MOTOR VEHICLE

CROSS-REFERENCE TO RELATED APPLICATIONS

This application claims priority to German Patent Application No. 10 2016 202 444.2, filed Feb. 17, 2016, the contents of which are hereby incorporated by reference in its entirety.

TECHNICAL FIELD

The present invention relates to an air-conditioning unit of a motor vehicle having a fan. The invention moreover relates to a motor vehicle equipped with such an air-conditioning unit.

BACKGROUND

DE 197 31 369 C1 discloses a generic air-conditioning unit for a motor vehicle having a fan and an evaporator, wherein a bypass channel bypassing the evaporator is provided.

DE 10 2010 029 495 A1 discloses a further generic air-conditioning unit.

CN 201205858 Y and JP 2006027377 A disclose air-conditioning units.

To enable the efficiency of today's air-conditioning units to be maximized, the aim is to only use as much energy for cooling and for heating in the air-conditioning unit as is actually needed for achieving or preserving the climatic comfort in the vehicle cabin. Avoiding unnecessary energy for cooling and for heating has a negative impact on the operating range, in particular in electric vehicles.

Modern air-conditioning units having regulated, externally controllable refrigerant compressors or electric refrigerant compressors enable the temperature level of air expelled at the exit of an evaporator to be raised up to ca. 12° C. If higher blow-out temperatures are required at the outlets of the air-conditioning unit depending on the ambient temperatures and the climate control of the vehicle interior, the air has to be additionally supplied with heat by way of the heat exchanger arranged in the air-conditioning unit. This frequently occurring operating situation is typical here for maintaining a state of comfort in the vehicle cabin and is thus a determining factor for the efficiency.

To keep the heating energy used for this as low as possible, the prior art discloses so-called bypass channels which bypass the respective evaporator of the air-conditioning unit on one side and thereby raise the temperature level. However, the bypass channels disclosed in the prior art are disadvantageous here in that the airflows exiting the evaporator and the bypass channel do not mix sufficiently with one another, which can result not only in undesired temperature strands and thus impairments to comfort but, in the worst case, also in a stratified airflow and a steaming-up of the windscreen, which can also impair the driving safety. Moreover, an unfavourable and, in particular, also non-reproducible mixing of the airflow from the evaporator and the bypass channel hinders the adjustment of the air-conditioning unit to achieve reproducible continuous regulating curves.

SUMMARY

The present invention is therefore concerned with the problem of providing an improved, or at least an alternative, embodiment for an air-conditioning unit of the generic type, which no longer has the disadvantages known from the prior art.

This problem is solved according to the invention by the subject matter of the independent claims. Advantageous embodiments are the subject matter of the dependent claims.

The present invention is based on the general idea of firstly arranging a first bypass channel bypassing an evaporator in an air-conditioning unit centrally on one side of the evaporator and moreover designing its width to be smaller than the width of the side of the evaporator on which it is arranged, thereby forcing particularly good mixing of an airflow flowing out of the evaporator with a comparatively warmer airflow flowing out of the bypass channel. In this arrangement, the inventive air-conditioning unit of a motor vehicle has a fan, in known manner, as well as the evaporator described above and a heat exchanger arranged downstream thereof, which are both arranged in a housing of the air-conditioning unit. However, as a result of the merely partial first bypass channel, which only extends over a portion of the width of the side of the evaporator on which it is arranged, not only can particularly good mixing of the two airflows be achieved, but the remaining free lateral space adjacent to the first bypass channel can moreover be used for further functional implementations. Until now, the bypass channel frequently occupied the entire width of the evaporator. In this case, "centrally" means centrally with respect to the width of the side.

In an advantageous further development of the solution according to the invention, a second bypass channel bypassing the heat exchanger is provided, which is arranged centrally on one side of the heat exchanger and whereof the width is smaller than the width of the side of the heat exchanger on which it is arranged. Analogously to the evaporator and the first bypass channel, it is therefore also possible with regard to the heat exchanger and the second bypass channel bypassing this to achieve particularly good mixing of the airflow flowing out of the heat exchanger and the second bypass channel, whereby not only can temperature strands be reliably avoided but reproducible continuous regulating curves of the air-conditioning unit can also be achieved.

In an advantageous further development of the solution according to the invention, the first bypass channel is arranged centrally on a lower side of the evaporator and the second bypass channel is arranged centrally on an upper side of the heat exchanger. To flow through the air-conditioning unit, an airflow flowing through the first and second bypass channel has to cross the airflow flowing through the evaporator and is thus mixed particularly well and homogeneously therewith. A particularly homogeneous mixing of the airflow flowing through the heat exchanger and the second bypass channel takes place analogously. It goes without saying that a reverse arrangement of the first and second bypass channel is also conceivable so that the first bypass channel is arranged for example centrally on an upper side of the evaporator and the second bypass channel is arranged centrally on a lower side of the heat exchanger.

Alternatively to this, it is also conceivable for the first bypass channel to be arranged on a lower side of the evaporator, as seen in the flow direction, whilst the second bypass channel is arranged centrally on an upper side of the heat exchanger and wherein the housing has two lateral condensate discharge means adjacent to the first bypass channel. Such an embodiment enables a particularly compact configuration to be achieved, which is highly advantageous, particularly in view of today's limited installation space in modern engine compartments. In an alternative arrangement of the first bypass channel on a left side or the right side of the evaporator or on an upper side thereof, the housing can also have a central condensate discharge means.

In general, the inventive merely partial bypass channel, taken in relation to a width of the respective side on which the first bypass channel is arranged, should correspond to the following criteria in order to function in a trouble-free and functionally reliable manner:
- a central position with regard to the width of the respective side of the evaporator on which the first bypass channel is arranged;
- a flow cross-section of the first bypass channel of between 30 cm$^2$ and 60 cm$^2$, wherein up to ca. 50% of the total air quantity should pass through the first bypass channel;
- a combination of the first bypass channel and a second bypass channel arranged on an opposing side of the heat exchanger, wherein a first valve, in particular a butterfly valve, is arranged at least in the first bypass channel and wherein a second valve can be arranged in the second bypass channel. The first and/or the second valve can be positioned here at virtually any point within the respective bypass channel.

As a result of the inventive central arrangement of the first bypass channel on one side of the evaporator and as a result of the inventive limiting of its width to a smaller width than the width of the side of the evaporator on which it is arranged, particularly good mixing of the airflow flowing through the evaporator with the airflow flowing through the first bypass channel can be achieved by the bypass channel according to the invention, in particular also without the provision of conducting elements which are complex in terms of their assembly and invariably bring about a drop in pressure.

The present invention is further based on the general idea of equipping a motor vehicle with such an air-conditioning unit, resulting in particular in comfort-related advantages, easier controllability and also greater functional reliability.

Further important features and advantages of the invention are revealed in the subclaims, in the drawings and in the associated description of the figures with reference to the drawings.

It goes without saying that the above-mentioned features and those still to be explained below can be applied not only in the combinations given in each case but also in other combinations or in isolation, without deviating from the scope of the present invention.

Preferred exemplary embodiments of the invention are illustrated in the drawings and are explained in more detail in the description below, wherein the same reference numerals relate to components which are the same or similar or have the same function.

BRIEF DESCRIPTION OF THE DRAWINGS

The drawings show schematically in each case.

DETAILED DESCRIPTION

Figure 1:
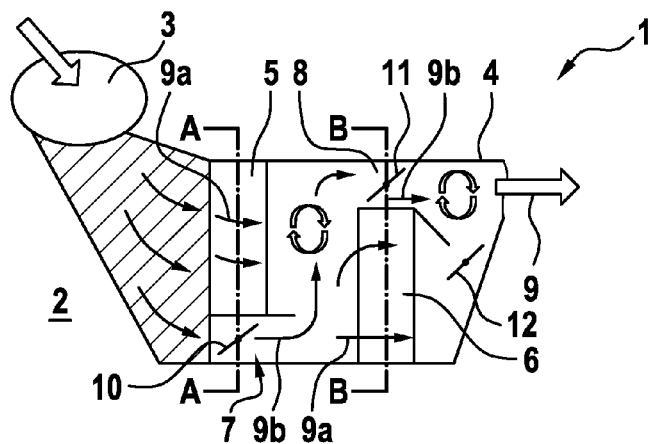
FIG. 1 a sectional illustration through an inventive air-conditioning unit corresponding to a first embodiment.
Figure 2:
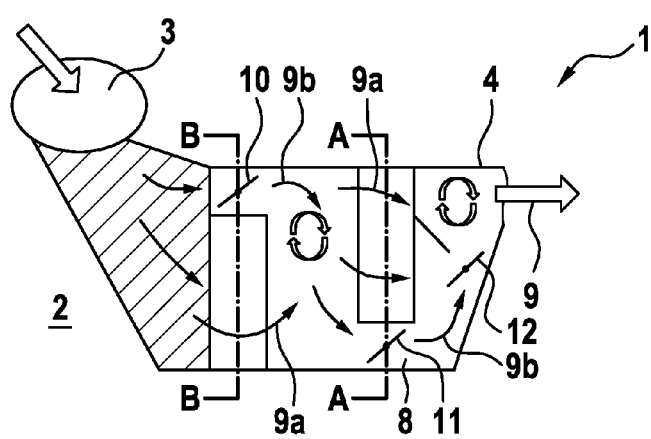
FIG. 2 an illustration similar to that in FIG. 1, but for a second embodiment.

Corresponding to FIGS. 1 and 2, an inventive air-conditioning unit 1 of a motor vehicle 2 (not otherwise illustrated) has a fan 3 and a housing 4, wherein both an evaporator 5 and a heat exchanger 6 downstream thereof are arranged in the housing 4. The heat exchanger 6 preferably serves exclusively here as a heating device for heating an airflow 9a flowing through it. According to the invention, a first bypass channel 7 bypassing the evaporator 5 is now provided, which is arranged centrally on one side of the evaporator 5 and whereof the width b is smaller than the width B of that side of the evaporator 5 on which it is arranged. According to FIGS. 1 and 2, the width b, B extends perpendicularly to the image plane here and can therefore only be seen in FIGS. 3 to 5. In this arrangement, the width b of the first bypass channel 7, like the width B of the evaporator 5, applies irrespective of its spatial orientation so that indeed the widths according to FIGS. 3 and 4, and the actual heights according to FIGS. 5a and 5b, of the first bypass channel 7 and the evaporator 5 can be subsumed hereunder.

As a result of the inventive central arrangement of the first bypass channel 7 and its considerably smaller width b in relation to the width B of the evaporator 5, a particularly effective mixing of the airflow 9a flowing through the evaporator 5 and the airflow 9b flowing through the first bypass channel 7 can be achieved downstream of the evaporator 5 and the first bypass channel 7 without having to provide further expensive swirling elements for this which have to be mounted separately and would moreover have the disadvantage of having an unfavourable impact on a drop in pressure.

With further regard to FIGS. 1 and 2, it can be seen that a second bypass channel 8 bypassing the heat exchanger 6 is provided, which is preferably likewise arranged centrally on one side of the heat exchanger 6 and whereof the width b is smaller than the width B of the side of the heat exchanger 6 on which it is arranged.

Figure 3:
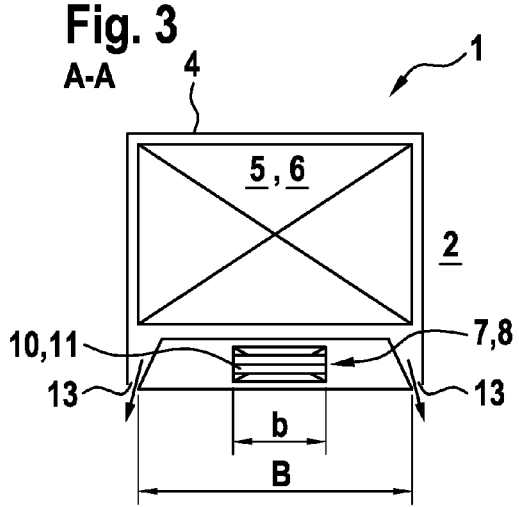
FIG. 3 a sectional illustration along the sectional plane A-A of FIG. 1 or 2.
Figure 4:
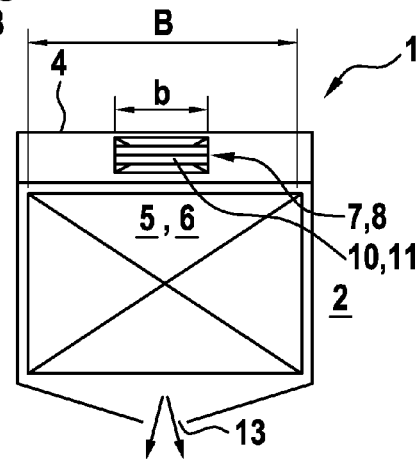
FIG. 4 a sectional illustration along the sectional plane B-B of FIG. 1 or 2.
Figure 5A:
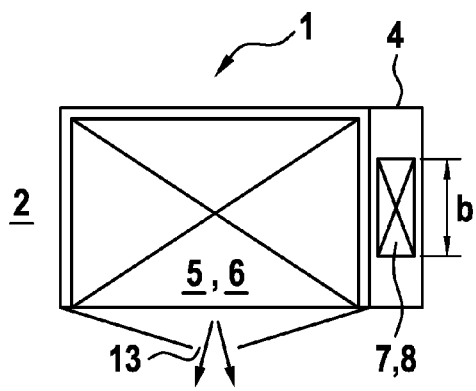
FIGS. 5a, b further alternative embodiments of the air-conditioning unit according to the invention.
Figure 5B:
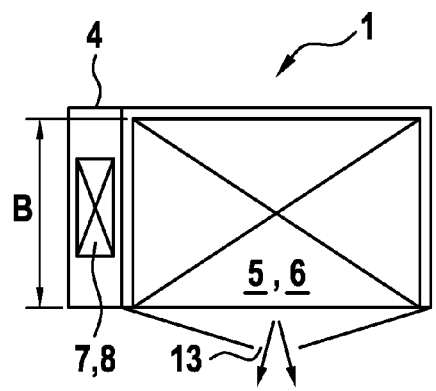

With regard to FIG. 3 it can be seen that, with reference to the sectional plane A-A and the first bypass channel 7 shown therein, this bypass channel is arranged centrally on a lower side of the evaporator 5. Alternatively to this, it can be seen in FIG. 4 in conjunction with FIG. 2 that the first bypass channel 7 is arranged on an upper side of the evaporator 5. Again alternatively to this, FIGS. 5a and 5b show that the first bypass channel 7 can also be arranged on a right side (c.f. FIG. 5a) or on a left side (c.f. FIG. 5b) of the evaporator 5 as seen in the flow direction 9. If FIGS. 3 to 5 relate to the second bypass channel 8, then the same applies analogously, although these are then arranged on a lower side (c.f. FIG. 3), on an upper side (c.f. FIG. 4) or on a right or left side (c.f. FIG. 5a or 5b) of the heat exchanger 6. The flow direction 9 extends perpendicularly into the image plane according to FIGS. 3 to 5.

So that it is possible to achieve the best and most homogeneous possible mixing of the airflows 9a, 9b flowing through the evaporator 5 and the first bypass channel 7 and the heat exchanger 6 and the second bypass channel 8, the first and the second bypass channel 7, 8 are preferably arranged centrally on opposing sides of the evaporator 5 or the heat exchanger 6. In concrete terms, this means according to FIG. 1, for example, that the first bypass channel 7 is arranged centrally on a lower side of the evaporator 5 and the second bypass channel 8 is arranged centrally on an opposing upper side of the heat exchanger 6.

FIG. 2 shows the exact reverse of this.

With regard to FIG. 5*b*, it can be seen that the first bypass channel 7 is arranged centrally on a left side of the evaporator 5, wherein the second bypass channel 8 in this case would be arranged centrally on a right side of the heat exchanger 6.

The first and the second bypass channel 7, 8 conventionally have a flow cross-section here of ca. 30 to 60 cm² and are preferably constructed in such a way that up to 50% of the total airflow can flow through the respective bypass channel 7, 8 and thus bypass the evaporator 5 or the heat exchanger 6. A first valve 10 is arranged in the first bypass channel 7 here, whilst a second valve 11 is arranged in the second bypass channel 8. A bypass flow/airflow 9*b* flowing in the first bypass channel 7 or in the second bypass channel 8 can therefore be regulated by way of the first and the second valve 10, 11. A third valve 12 can moreover be arranged downstream of the heat exchanger 6 (c.f. FIGS. 1 and 2), by way of which valve it is again possible to achieve a homogenization of the individual airflows 9*a*, 9*b*.

With regard to FIG. 3, it can be seen that, in an arrangement in which the first bypass channel 7 is selected to be central on a lower side of the evaporator 5, for example, the housing 4 has two lateral condensate discharge means 13, whereby a particularly compact construction can be achieved. In contrast to this, the housing 2 according to FIGS. 4 and 5 has a central condensate discharge means 13 on a lower side in each case.

Figure 6:
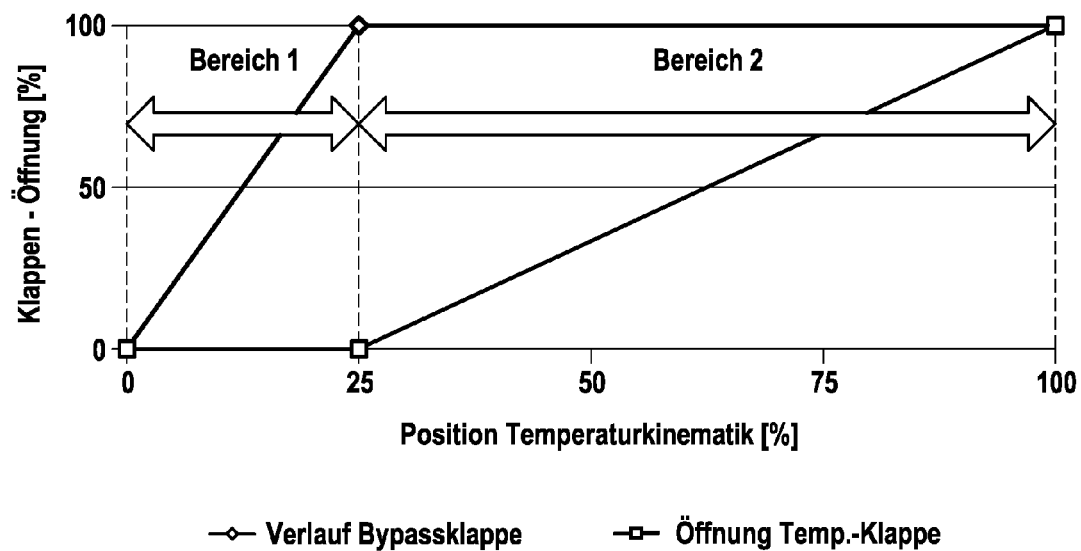
FIG. 6 a valve opening versus position-temperature kinematics graph.

Finally, with regard to FIG. 6, it can be seen that, in the region 1, a regulation of the temperature of the airflow flowing through the air-conditioning unit 1 can take place exclusively by way of the first valve 10 and thus a regulation of the airflow 9*b* flowing through the first bypass channel 7 can take place. Moreover, if the mixing temperature is to be increased, this can be achieved in the region 2 through the adjustment of the second valve 11 and possibly the third valve 12 [0038] By means of the first bypass channel 7, which is designed according to the invention and arranged centrally on one side of the evaporator 5, it is possible to generate particularly good mixing of an airflow flowing through the air-conditioning unit 1 and thus a particularly homogeneous airflow, which not only implies an increase in comfort in terms of the air-conditioning but also reliably avoids hitherto-occurring temperature strands. In general, a tapping-off of the airflow 9*b* flowing through the first bypass channel 7 can take place here in the entire shaded region according to FIGS. 1 and 2 so that the embodiment shown should merely be regarded as purely exemplary.

The invention claimed is:

1. An air-conditioning unit of a motor vehicle, comprising:
   a fan;
   an evaporator and a heat exchanger arranged downstream thereof, the evaporator and the heat exchanger being arranged in a housing; and
   a first bypass channel bypassing the evaporator;
   wherein the first bypass channel is arranged centrally on a side of the evaporator, and a width of the first bypass channel is smaller than a width of the side of the evaporator on which the first bypass channel is arranged.

2. The air-conditioning unit according to claim 1, further comprising a second bypass channel bypassing the heat exchanger that is arranged centrally on a second side of the heat exchanger, wherein a width of the second bypass channel is smaller than a width of the second side of the heat exchanger on which the second bypass channel is arranged.

3. The air-conditioning unit according to claim 2, wherein one of:
   the second bypass channel is arranged centrally on one of an upper side and a lower side of the heat exchanger; or
   the second bypass channel is arranged centrally on one of a left side and a right side of the heat exchanger with respect to a flow direction.

4. The air-conditioning unit according to claim 2, wherein one of:
   the first bypass channel is arranged centrally on an upper side of the evaporator and the second bypass channel is arranged centrally on a lower side of the heat exchanger;
   the first bypass channel is arranged centrally on a lower side of the evaporator and the second bypass channel is arranged centrally on an upper side of the heat exchanger;
   the first bypass channel is arranged centrally on a right side of the evaporator with respect to a flow direction and the second bypass channel is arranged centrally on a left side of the heat exchanger with respect to the flow direction; or
   the first bypass channel is arranged centrally on a left side of the evaporator with respect to the flow direction and the second bypass channel is arranged centrally on a right side of the heat exchanger with respect to the flow direction.

5. The air-conditioning unit according to claim 2, wherein at least one of the first bypass channel and the second bypass channel have a flow cross-sectional area of approximately 30 cm² to 60 cm².

6. The air-conditioning unit according to claim 2, further comprising at least one of:
   a first valve arranged in the first bypass channel; and
   a second valve arranged in the second bypass channel.

7. The air-conditioning unit according to claim 1, wherein one of:
   the first bypass channel is arranged centrally on one of an upper side and a lower side of the evaporator; or
   the first bypass channel is arranged centrally on one of a left side and a right side of the evaporator with respect to a flow direction.

8. The air-conditioning unit according to claim 1, further comprising a valve arranged downstream of the heat exchanger.

9. The air-conditioning unit according to claim 1, wherein one of:
   the first bypass channel is arranged centrally on a lower side of the evaporator and the housing has two lateral condensate discharges; or
   the first bypass channel is arranged centrally on one of an upper side, a left side, and a right side of the evaporator and the housing has a central condensate discharge.

10. A motor vehicle, comprising an air conditioning unit having:
    a fan;
    an evaporator and a heat exchanger arranged downstream thereof, the evaporator and the heat exchanger being arranged in a housing; and
    a first bypass channel bypassing the evaporator;
    wherein the first bypass channel is arranged centrally on a side of the evaporator and a width of the first bypass channel is smaller than a width of the side of the evaporator on which the first bypass channel is arranged.

11. The motor vehicle according to claim 10, further comprising a second bypass channel bypassing the heat exchanger that is arranged centrally on a second side of the heat exchanger and a width of the second bypass channel is smaller than a width of the second side.

12. The motor vehicle according to claim 11, wherein one of:
the second bypass channel is arranged centrally on one of an upper side and a lower side of the heat exchanger; or
the second bypass channel is arranged centrally on one of a left side and a right side of the heat exchanger with respect to a flow direction.

13. The motor vehicle according to claim 11, wherein one of:
the first bypass channel is arranged centrally on an upper side of the evaporator and the second bypass channel is arranged centrally on a lower side of the heat exchanger;
the first bypass channel is arranged centrally on a lower side of the evaporator and the second bypass channel is arranged centrally on an upper side of the heat exchanger;
the first bypass channel is arranged centrally on a right side of the evaporator with regard to a flow direction and the second bypass channel is arranged centrally on a left side of the heat exchanger with regard to the flow direction; or
the first bypass channel is arranged centrally on a left side of the evaporator with regard to the flow direction and the second bypass channel is arranged centrally on a right side of the heat exchanger with regard to the flow direction.

14. The motor vehicle according to claim 11, wherein at least one of the first bypass channel and the second bypass channel have a flow cross-section of approximately 30 cm$^2$ to 60 cm$^2$.

15. The motor vehicle according to claim 11, wherein at least one of:
a first valve is arranged in the first bypass channel; and
a second valve is arranged in the second bypass channel.

16. The motor vehicle according to claim 15, wherein a third valve is arranged downstream of the heat exchanger.

17. The motor vehicle according to claim 10, wherein one of:
the first bypass channel is arranged centrally on one of an upper side and a lower side of the evaporator; or
the first bypass channel is arranged centrally on one of a left side and a right side of the evaporator with respect to a flow direction.

18. The motor vehicle according to claim 10, wherein one of:
the first bypass channel is arranged centrally on a lower side of the evaporator and the housing has two lateral condensate discharge means; or
the first bypass channel is arranged centrally on one of an upper side, a left side, and a right side of the evaporator and the housing has a central condensate discharge means.

19. A motor vehicle air-conditioning unit, comprising:
a fan;
an evaporator and a heat exchanger arranged downstream thereof, that are both arranged in a housing;
a first bypass channel bypassing the evaporator that is arranged centrally on a first side of the evaporator and a width of the first bypass channel is smaller than a width of the first side;
a second bypass channel bypassing the heat exchanger that is arranged centrally on a second side of the heat exchanger and a width of the second bypass channel is smaller than a width of the second side of the heat exchanger;
a first valve arranged in the first bypass channel; and
a second valve arranged in the second bypass channel.

20. The air-conditioning unit according to claim 19, wherein one of:
the first bypass channel is arranged centrally on a lower side of the evaporator and the housing has two lateral condensate discharge means; or
the first bypass channel is arranged centrally on one of an upper side, a left side, and a right side of the evaporator and the housing has a central condensate discharge means.

* * * * *